United States Patent
Ummenhofer et al.

(10) Patent No.: US 10,697,488 B2
(45) Date of Patent: Jun. 30, 2020

(54) CONNECTION BETWEEN TWO JOINING PARTNERS, AND METHOD FOR ESTABLISHING SAID CONNECTION

(71) Applicant: Karlsruher Institut fuer Technologie, Karlsruhe (DE)

(72) Inventors: Thomas Ummenhofer, Karlsruhe (DE); Matthias Albiez, Karlsruhe (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 205 days.

(21) Appl. No.: 15/534,525

(22) PCT Filed: Dec. 8, 2015

(86) PCT No.: PCT/EP2015/002469
§ 371 (c)(1),
(2) Date: Jun. 9, 2017

(87) PCT Pub. No.: WO2016/091377
PCT Pub. Date: Jun. 16, 2016

(65) Prior Publication Data
US 2017/0321733 A1  Nov. 9, 2017

(30) Foreign Application Priority Data
Dec. 12, 2014 (DE) .................. 10 2014 118 489

(51) Int. Cl.
*F16B 11/00* (2006.01)
*B29C 65/48* (2006.01)

(52) U.S. Cl.
CPC ........ *F16B 11/008* (2013.01); *B29C 65/4805* (2013.01); *Y10T 403/47* (2015.01)

(58) Field of Classification Search
CPC ............. B29C 65/4805; B29C 65/483; B29C 65/4835; B29C 65/4845; B29C 66/52272; B29C 66/52271; B29C 70/84; B26L 2031/10; B26L 2031/24; B26L 2031/75; F16B 7/00; F16B 11/006; F16B 11/008;
(Continued)

(56) References Cited

U.S. PATENT DOCUMENTS

| 4,380,547 A | 4/1983 | Materne |
| 4,388,839 A | 6/1983 | Benisti |

(Continued)

FOREIGN PATENT DOCUMENTS

| DE | 19958375 A1 | 6/2001 |
| DE | 10330963 A1 | 1/2005 |

(Continued)

OTHER PUBLICATIONS

Specification Translation of DE 102012001943 A1. Eser, et al. Method for manufacturing tubular motor vehicle chassis component. Aug. 8, 2013.*

*Primary Examiner* — Josh Skroupa
(74) *Attorney, Agent, or Firm* — Leydig, Voit & Mayer, Ltd.

(57) ABSTRACT

A connection between at least two joining partners includes an interlying joining gap, with opposite joining surfaces. At least one of the joining surfaces is wetted with an adhesive layer having incorporated and/or attached solids particles, and the remaining joining gap is filled with an inorganic and/or organic filler material.

20 Claims, 3 Drawing Sheets

(58) Field of Classification Search
CPC ....... F16L 13/103; F16L 33/34; Y10T 403/47; Y10T 403/473–477
USPC ............... 403/265, 268–270; 29/DIG. 1
See application file for complete search history.

(56) References Cited

U.S. PATENT DOCUMENTS

| | | | |
|---|---|---|---|
| 4,752,151 A | 6/1988 | Ashida et al. | |
| 5,052,848 A * | 10/1991 | Nakamura | B62K 19/22 403/267 |
| 6,742,258 B2 * | 6/2004 | Tarbutton | F16B 11/008 29/421.1 |
| 7,918,006 B2 * | 4/2011 | Brayman | F16L 13/103 285/332 |
| 9,470,355 B2 * | 10/2016 | Litzenburger | B29C 66/52272 |
| 9,702,391 B2 * | 7/2017 | Erlacher | F16B 11/008 |
| 2006/0185279 A1 | 8/2006 | Eusterbarkey | |
| 2010/0320694 A1 * | 12/2010 | Gromotka | B29C 45/14385 277/316 |
| 2014/0376995 A1 * | 12/2014 | Faass | F16B 11/008 403/267 |
| 2017/0045068 A1 * | 2/2017 | Sikorski | F16L 13/103 |

FOREIGN PATENT DOCUMENTS

| | | | | |
|---|---|---|---|---|
| DE | 102012001943 A1 | | 8/2013 | |
| EP | 0042089 A2 | | 12/1981 | |
| GB | 1152649 A | * | 5/1969 | ............ F16L 13/103 |

\* cited by examiner

CONNECTION BETWEEN TWO JOINING PARTNERS, AND METHOD FOR ESTABLISHING SAID CONNECTION

CROSS REFERENCE TO RELATED APPLICATIONS

This application is a U.S. National Stage Application under 35 U.S.C. § 371 of International Application No. PCT/EP2015/002469 filed on Dec. 8, 2015, and claims benefit to German Patent Application No. DE 10 2014 118 489.0 filed on Dec. 12, 2014. The International Application was published in German on Jun. 16, 2016 as WO 2016/091377 A1 under PCT Article 21(2).

FIELD

The invention relates to a connection between two joining partners, preferably two components, more preferably two metallic components which preferably have a smooth surface, and it also relates to a method for producing such a connection.

BACKGROUND

The connection mentioned at the outset is a hybrid adhesive bond which is employed in the field of joining technology, more specifically in particular in the connection of construction components, preferably steel, metal or plastics hollow profiles, with uses for example in the construction of buildings, infrastructures, bridges, cranes, towers and wind turbines.

Conventional connections between construction components are usually implemented by welding, screwing or riveting. Recently, however, adhesive bonds, as are generally known in vehicle construction or in the aerospace industry, are increasingly the focus of applied research projects for this purpose in civil engineering as well. In contrast to the structural adhesive bonds in automobile construction which are implemented with thin adhesive layers and often under clean laboratory-type environmental conditions, in the building industry a thin layer adhesion cannot generally be carried out due to the unavoidable considerable manufacturing and dimensional tolerances of the joining partners. The real gap dimensions to be bridged in the building industry are often of the order of magnitude of from 3 to 15 mm and even greater. This leads to a diminishing capacity to withstand stress compared with thin layer adhesions, and it also means large quantities of adhesive are required which, when the usual quality adhesives are used, entails enormous costs. Furthermore, the adhesive bond has to be carried out in situ under sometimes adverse construction site conditions due to the structure sizes. This increases the susceptibility to defects in the adhesive bond.

It is generally known to reinforce concrete with metal or plastics structures or to cast metallic elements fully or in part into concrete and to thereby fix them in a form-locking manner. For example, in reinforced concrete construction, steel rods or steel mats have been laid in situ in the concrete for decades and have been connected in a form-locking manner as a result of the curing of the concrete. Likewise, it is generally possible to cast into concrete metallic elements such as masts, posts, abutments, bollards or other retaining means also in situ in a form-locking manner and thus to fix them in a stationary manner in the foundations or on civil engineering structures. In this respect, the metallic elements are incorporated in a matrix of concrete or mortar.

It is not easily possible to transfer these known technologies to an adhesive bond, i.e. to a connection between two mutually opposite joining surfaces of two joining partners.

However, a joining method in the building industry provides casting adhesive gaps between preferably metal construction components, one of which has been inserted into the other, with a mineral binder, such as mortar, instead of with an organic adhesive. In this respect, a form-locking connection of the mortar with the joining surfaces is produced, which is commonly known by experts as a grouted joint.

By way of example, the website of SKI Schaumann & Keindorf Ingenieur-ges mbH, i.e. http://www.ski-consult.de/verbindungstechnik/grouted-joints.html, discloses (as of Nov. 26, 2014) a grouted joint connection of this type between two overlapping pipes, inserted one inside the other, in the offshore oil and gas industry, in which the joining gap, produced by the overlap region, is filled with a mortar. The joining surfaces are configured in an encircling manner corresponding to the pipe diameters. A movement of said pipes relative to one another is thereby practically only possible as a shearing movement in the radial or axial pipe orientation within the scope of the described connection. To prevent this, the joining surfaces are provided with projecting welded-on shear ribs which cause the formation of compression struts between offset, opposite shear ribs. This significantly increases in particular the bearing capacity of the connection in the longitudinal direction of the pipe. However, the connection concept not only remains form-locking, but also gives rise to pronounced stress inhomogeneities in the mortar, which results in material fatigue, particularly in the case of an alternating load. In this respect, the focus of experiments was to improve the load-bearing strength and fatigue resistance by using different filler materials.

DE 103 30 963 A1 discloses a similar configuration for a foundation for constructions, where an inner pipe is inserted inside an outer pipe, with the formation of a substantially encircling intermediate space, the intermediate space being filled at least in part with a concrete-type substance and the joining surfaces being provided with annular accumulations of material to increase the possible shear transfer.

SUMMARY

In an embodiment, the present invention provides a connection between at least two joining partners. The connection includes an interlying joining gap, with opposite joining surfaces. At least one of the joining surfaces is wetted with an adhesive layer having incorporated and/or attached solids particles, and the remaining joining gap is filled with an inorganic and/or organic filler material.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
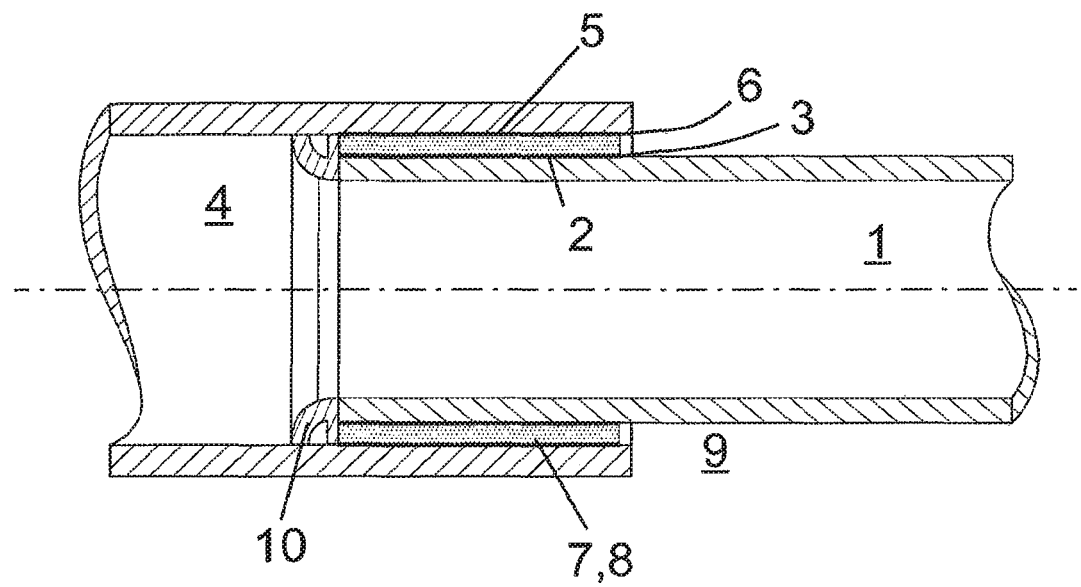
FIG. 1 is a sectional view of an embodiment with two pipes, arranged concentrically one inside the other, as joining partners and having a cylindrically encircling annular gap as the joining gap.

Described herein is a mechanical connection between at least two joining partners, preferably two components, more preferably two metallic pipes, one of which is inserted concentrically into the other, with an increased static and, if necessary, cyclical stress resistance.

Such a connection can be configured so that it can be implemented in situ in a procedurally reliable manner and thereby easily and without any defects under given production and assembly marginal conditions.

A method for producing such a connection is also described herein.

According to an embodiment of the invention, a connection is provided between two joining partners, having an interlying joining gap, with opposite joining surfaces. In this respect, two joining partners having two joining surfaces are preferably involved. The joining partners are preferably pipe elements (round pipes, rectangular hollow profiles, square hollow profiles, full cross sections, etc.). The two joining partners are preferably formed by a connector which preferably has a rotationally symmetrical outer surface, and by a bushing which preferably has an encircling, preferably rotationally symmetrical inner surface. Furthermore, in turn, the connector and the bushing are preferably formed by two pipe elements which are preferably arranged one inside the other and preferably also coaxially to one another and which have different diameters.

More complex structures having more than two joining partners and/or joining surfaces are also within the scope of the solution and are part of the invention, as is an incorporation or connection of metal or plastics profiles, for example L, T or double-T profiles, into correspondingly formed counterparts as joining partners (for example in the case of bridges, lattice structures, or the like). In the case of these joining partners, the joining gap preferably does not have a constant gap width.

An optional embodiment provides a joining gap which has different joining gap widths over the extent of the joining surfaces. In this case, the joining surfaces are preferably not arranged parallel to one another over their extent (of the overlap region), but they change their distances locally. This can be in the longitudinal direction and in the circumferential direction of the part to be joined. This includes, for example optional points of discontinuity in at least one of the joining surfaces as well as a possible conical shape of the joining gap.

Likewise, it is optionally also possible to vary the thicknesses of at least one adhesive layer and/or of the filler material over the extent of the joining surfaces, as a result of which the strength of the connection between the filler material and the adhesive layer in respect of shear stress increases in particular.

At least one of the joining surfaces can be wetted with a preferably organic adhesive layer having incorporated and/or attached solids particles and the remaining joining gap can be filled with an inorganic or organic filler material, preferably with grouting mortar or a mixture of organic and inorganic material or a different inorganic, hydraulically or non-hydraulically setting material.

The grouting mortar which has preferably been proposed as filler material is a very economical inorganic material which, when cured, has a high rigidity and relatively high compressive stressability. However, the realizable adhesive forces to adjoining surfaces are low to non-existent compared with organic adhesive systems, such as an organic epoxy resin adhesive or a polyurethane adhesive. This is the starting point for the invention. The adhesive volume which is high on account of the large thickness, usual in construction, of the joining gap (of the order of magnitude of from 3 to 15 mm and above) is mainly filled using a low-shrinkage or non-shrinkage grouting mortar or swelling mortar. The required adhesion to the joining surfaces is achieved by the mentioned organic adhesive layer with incorporated and/or attached solids particles as an intermediate layer. While the organic adhesive of the adhesive layer ensures a good attachment to the preferably metallic joining surfaces, the solids particles allow a good attachment to the filler, the two attachments advantageously extending almost uniformly over the entire joining surfaces.

The preferably organic adhesive layer preferably consists of a chemically curing adhesive. Curing takes place by a chemical reaction of the at least one component of the adhesive. In contrast to physically curing adhesives, chemically curing adhesives preferably do not have any solvent constituents and/or marked softening temperature intervals which, per se, would increase a basically undesirable flow behavior of the adhesive layer.

Furthermore, the adhesive layer preferably consists of an epoxy resin adhesive or polyurethane adhesive, in which after a resin component and a hardener component have cured, a thermosetting plastics, i.e. a stable plastics material without a softening temperature interval, is produced.

Adjusting a stoichiometric homogeneous mixture ratio of resin component and hardener component before the reaction is essential for a complete homogeneous curing of the epoxy resin adhesive or polyurethane adhesive to produce a plastics material having an advantageous minimum flow behavior. This is preferably carried out by mechanical, i.e. non-manual, mixing processes of preferably relatively large quantities of resin component and hardener component.

Adhesives based on epoxy resins or polyurethanes usually cure completely at ambient temperature (a maximum of 35° C.).

In an alternative embodiment, epoxy resins or polyurethanes are proposed in which curing takes place at an elevated temperature of above 50° C., preferably above 80° C., more preferably above 120° C. Compared with curing at room temperature (20° C.), an adhesive layer of this type has a more complete reaction, improved full curing, thereby an increased strength and a further reduced flow behavior as well as a better attachment to the joining surfaces of the joining partners. In addition, the viscosity of the epoxy resin adhesives falls before a reaction at elevated temperature which, during the application of the adhesive layer, improves the wetting and attachment to the adjacent joining surfaces and thus improves an integral and form-locking attachment.

Here, single-component epoxy resin adhesives are particularly advantageous, for which in an industrially operable production, the resin component and hardener component can be mixed together more homogeneously and in a stoichiometric ratio, and curing is started or is substantially accelerated by a chemical reaction preferably only at an elevated temperature.

The organic adhesive layers preferably do not have any additives such as particles or other substances which reduce the strength and/or disadvantageously increase the flow behavior. Included here, particularly in the case of dyes based on epoxy resins, are color pigments to adjust a color tone and/or to prevent corrosion, as well as carbon components or tar components or other substances to adjust and/or increase resilience.

Solids particles are also incorporated into and/or attached to the adhesive layer. The solids particles preferably consist of a non-metallic inorganic and/or a metallic material, i.e. materials which preferably allow an integral bond with a preferred mineral binder of the filler material. Non-metallic inorganic solids particles preferably consist of silicon compounds, of an aggregate such as preferably special fused alumina, silica sand or gravel chippings which are also known as aggregates for mineral hydraulic binders. Metallic solids particles preferably consist of steel cut wire shot, steel grit or cast steel balls. In particular, the surfaces of the solids particles which are exposed to the setting procedure of the filler material preferably react with the mineral binder or with other ingredients of the filler material.

In an alternative embodiment of the invention, the adhesive layer is formed as an inorganic adhesive layer, for example as an enameling of glass-forming oxides of the joining surfaces. Layers of this type advantageously practically completely exclude plastic deformations, even at elevated temperatures below the glass softening temperature, in particular between 100 and 600° C. The solids particles preferably consist of metal particles or ceramic particles (in particular nitrides, carbides, oxides, for example corundum, $Al_2O_3$, $Si_3N_4$, SiC, $B_4C$, BN, TiN, WC etc.) having melting or softening temperatures above the enameling temperature (for example between 800 and 900° C.).

A method according to an embodiment of the invention for producing a connection between two joining partners, having a joining gap, with opposite joining surfaces includes the following steps:
a) coating at least one of the joining surfaces with an organic adhesive layer having incorporated and/or attached solids particles,
b) curing the organic adhesive layer,
c) positioning the two joining partners against one another, the joining surfaces of which being opposite one another at least in part, with the formation of the joining gap,
d) filling the joining gap with an inorganic filler material, and
e) curing the inorganic filler material in the joining gap.

The steps of the method are preferably carried out in the above-mentioned sequence.

The described procedure entails in particular a considerable cost reduction and an increase in the bearing capacity of the connection. The particular advantage of the method is that steps a) and b) can be carried out while preparing the joining partners not only in situ on a construction site, but preferably in a different location under better and in particular more effectively controllable and maintainable process conditions (in particular with regard to climate, humidity, temperature, atmosphere, risk of contamination, working conditions, tool availability, handling of the joining partners, production accuracy, economic efficiency). The very sensitive organic adhesive bond is thus advantageously produced in the region of the pre-fabrication of the joining parts, for example in a manufacturing establishment under defined conditions (industrially under protected conditions). For example, this not only allows a surface preparation of the joining surfaces, such as a roughening, a drying or a temperature-control treatment with precision and under environmental conditions which are impossible or are only possible at a far greater expense in situ on a construction site compared with a preparation in a preferably closed workshop. In this respect, the environmental conditions can preferably be adapted to the values (temperature, air humidity, atmosphere) which are ideal for processing and curing the adhesive.

On the other hand, (preferably only) method steps c) to e), in which only the prepared joining partners have to be brought into position and only the filler material, preferably a grouting mortar of the aforementioned type, has to be prepared and processed, are preferably carried out, as is conventional in construction, in situ under construction site conditions (i.e. requirements usual in the building industry which are imposed on environmental conditions, personnel qualifications and application technique), for example on a site for the construction of buildings, bridges, plants or onshore and offshore wind turbines.

Furthermore, the connection and the method have a considerable economic advantage over time-intensive and cost-intensive welded joints or over the more expensive and, with regard to production, complex and relatively defect-susceptible adhesive bonds while only using an organic adhesive.

In a first embodiment of the method, the joining surfaces are first of all coated in a first partial step with an application of the adhesive layer initially without the solids particles. Subsequently, in a second partial step, the solids particles are then applied to the adhesive layer. This embodiment is particularly suitable for implementing a high surface proportion which is exposed to the setting procedure of the filler material, i.e. it is particularly advantageous in the case of a filler material having a high proportion of mineral binder. Furthermore, there is a significant increase in the surface roughness of the adhesive layer which further improves not only the integral bonding but also the form-locking bonding.

In an alternative embodiment, the filler material and the organic adhesive layer having the optionally introduced solids particles are connected by a chemical or physical activation after the filler material has cured. A hybrid filler material consisting of organic and inorganic components and the inorganic adhesive layer are connected via a chemical or physical activation after the inorganic filler material has cured, preferably by induction, temperature, microwave or time-delayed chemical reactions.

In a second embodiment of the method, the coating of the joining surfaces takes place with an application of the adhesive layer together with the solids particles. The solids particles are preferably mixed with the adhesive before application, which advantageously promotes a homogeneous thorough mixing.

Further embodiments provide an adhesive layer which consists of a plurality of individual layers which are applied serially one on top of another. The individual layers preferably differ in their content of solids particles. A preferred embodiment in this respect is to provide the individual layer without solids particles directly on the joining surface for an optimized integral bond, to provide thereon at least a further individual layer with solids particles and thereafter optionally to apply solids particles onto the uppermost individual layer.

After the adhesive layer has cured, the joining partners are pre-assembled at the construction site, the joining gap allowing an equalization of inaccuracies in production. A load-bearing hybrid adhesive bond is finally implemented by the controlled introduction and setting of the grouting mortar in the joining gap.

Alternatively, introduced into the joining gap or in the filler material is a reinforcement in the form of fibers or structures such as rods or rigidly constructed moldings of metal, glass fibers, plastics or carbon fibers. They are used to reinforce and/or to increase the strength of the filler material, to increase the elongation at break and/or to prevent the progression of cracks and thereby premature failure of the filler material.

One embodiment provides integrating the aforementioned reinforcement, during the introduction of the adhesive layers, with one part in the adhesive, while the remaining other part projects out of the adhesive layer and is incorporated by the filler material of the aforementioned type, preferably a grouting mortar. The attachment of the filler material to the adhesive layer increases significantly thereby.

An alternative embodiment provides the use of a physically or chemically activatable organic adhesive, for example. In method step a), this adhesive is applied to the joining surfaces preferably away from the construction site, and curing according to method step b) is only activated at a later time, i.e. only after one of the subsequently mentioned method steps c), d) or e). In situ on the construction site, the joining partners are then placed one against the other with the not yet cured adhesive (method step c)) and the joining gap is then filled with grouting mortar (step d)). Thereafter, a preferably integral bond is produced between the grouting mortar and joining surfaces by physical activation (introduction of heat, for example by induction or infrared radiation), or by chemical activation (for example by alkalinity) of the adhesive layer. The filler material (grouting mortar) is preferably cured before after the adhesive layer has cured.

Before the filler material is poured into the joining gap, it must be ensured that it completely fills the filling gap and preferably only fills this. It is proposed that the joining gap is provided with sealants around the joining surfaces before the filling material is poured in and is thereby sealed to form a joining gap volume which is otherwise closed apart from at least one sprue and optionally a riser volume.

The connection can have, inter alia, the following advantages:
  High quality and manufacturing reliability of the adhesive bond due to the production of the qualitatively demanding organic thin layer adhesion away from the construction site, for example in a production plant.
  Considerable financial savings using grouting mortar compared with the filling of gaps with organic adhesive (by a cost factor of more than 100).
  The connection causes only slight local excesses of stress caused by the particular shape of the connection. Laboratory experiments consequently showed very high load-bearing capacities with extremely low dispersions (failure loads: factor 10 for conventional mortaring, higher strengths than organic thick layer bonds).
  The use of a thick joining gap can compensate for tolerances in terms of production and assembly.
  In contrast to welding, there is no damaging introduction of heat into the parts to be joined, i.e. the components can be supplied in an externally ready-coated state; after-coating on the construction site is unnecessary.
  Compared with screw and rivet connections, the load is introduced extensively rather than locally.
  Since a notch effect due to welded seams or local load introduction sites (for example screws) does not occur, high fatigue strength can be assumed.

The sectional view in FIG. 1 shows an embodiment with an inner pipe 1 having an outer cylindrical joining surface 2 and a first adhesive layer 3 applied thereto. Arranged concentrically around the inner pipe is an outer pipe 4 which has an inner cylindrical joining surface 5 which is coated with a second adhesive layer 6. In the embodiment, the inner pipe and the outer pipe form the joining partners which, with their respective joining surfaces, form a joining gap 7 which is filled with filler material 8. The filler material preferably consists of a grouting mortar which is flowable in an uncured state; it is poured from above, in the case of a vertical orientation of the pipes, into an open side 9 of the joining gap (for this, the view shown in FIG. 1 would have to be rotated by 90° to the left) and is sealed at the other (lower) end of the joining gap by an annular sealing plug 10 to prevent the filler material from escaping. If, with a non-vertical orientation, the joining gap had to be filled with an initially flowable filler material, the joining gap would have to be sealed on both sides by sealants such as the aforementioned annular sealing plug, in which case the higher positioned sealing plug comprises a sprue and preferably also a riser volume at the upper end in each case.

Figure 2A:
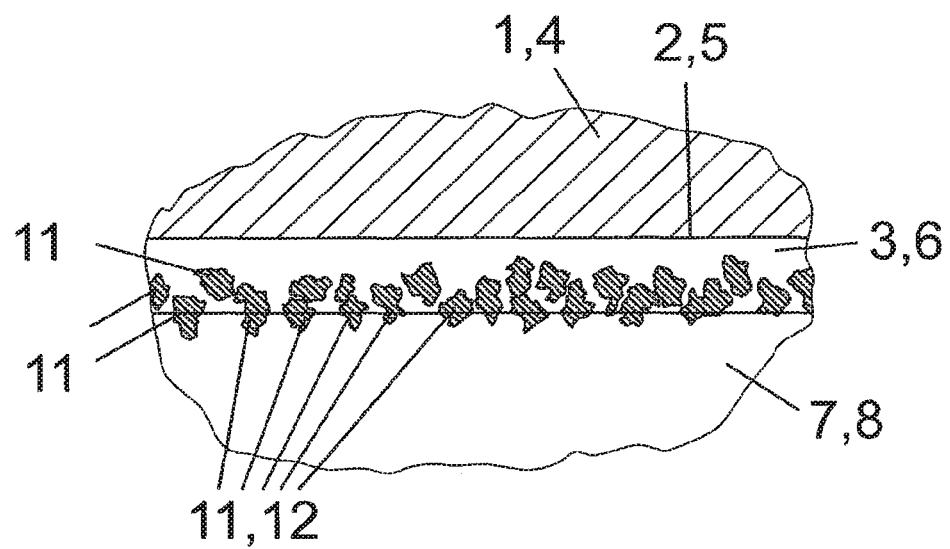
FIGS. 2a to 2d are in each case sectional views of an adhesive layer (FIGS. 2a and 2b) and of an adhesive layer bond (FIGS. 2c and 2d), in each case with adjacent joining partners and filler material.
Figure 2B:
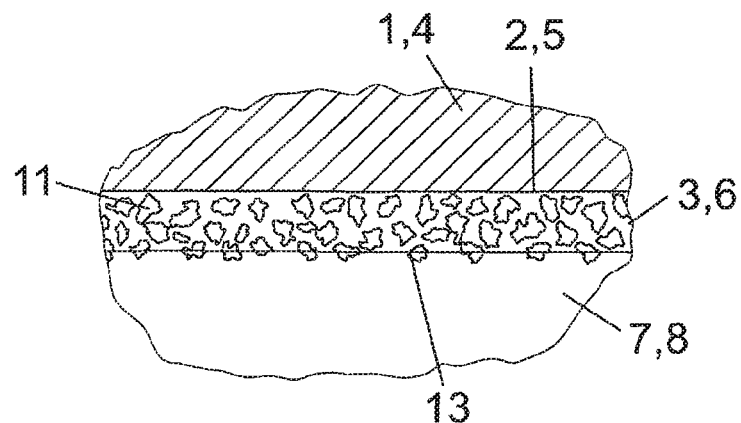
Figure 2C:
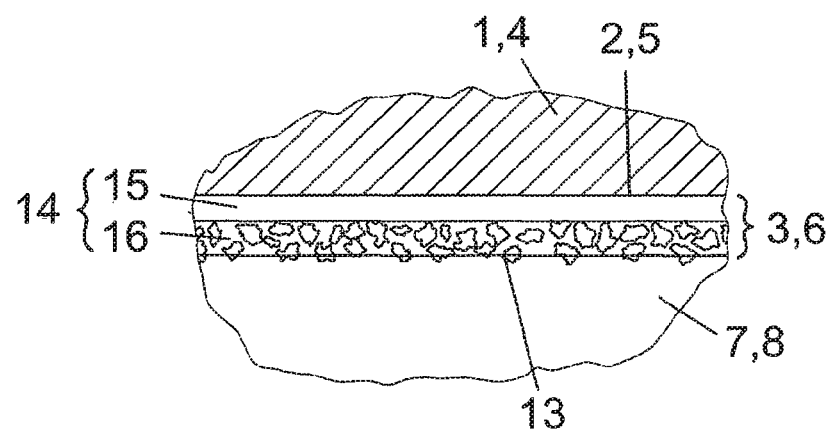

FIGS. 2a to 2c are in each case sectional detailed views of embodiments of the adhesive layers 3 and/or 6 with solids particles 11.

FIG. 2a represents an embodiment in which, according to the aforementioned first embodiment of the method, the joining surfaces 2 and/or 5 are firstly coated in a first partial step initially without the solids particles, alternatively with a small proportion of the solids particles (for example from 20 to at most 50% of the solids particles content based on the coating in the end state). Then, in a second partial step, the solids particles or the remaining solids particles are applied to the not yet attached adhesive layer and they are taken up in part or completely by said adhesive layer. In this embodiment, the only partly surrounded solids particle proportions 12 particularly advantageously have a surface proportion which has never been wetted before by adhesive, as a result of which there is advantageously an improved attachment to a mineral filler.

FIG. 2b represents an embodiment in which, according to the aforementioned second embodiment of the method, the coating of the joining surfaces 2 and/or 5 is applied to the joining surface together with the solids particles. Here, the particles are preferably completely wetted by the adhesive, although some of the solids particles protrude out of the surface 13 of the adhesive and can be joined in a form-locking manner with the filler 8.

FIG. 2c represents an embodiment in which the coating 3 consists of a laminar structure 14 of, for example, two individual layers which have been applied serially one on top of the other. The individual layers preferably differ in their content of solids particles. In the example shown, the first individual layer 15 applied first of all to the joining surface does not have any solids particles and is thus used functionally as a foundation for the second individual layer 16, applied thereto, with incorporated solids particles 11.

Figure 2D:
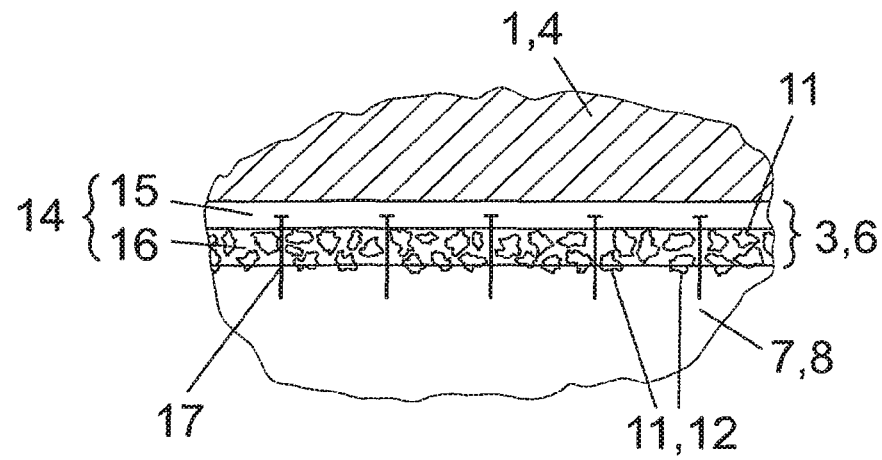

In a specific embodiment, the first individual layer 15 is preferably applied without solids particles together with reinforcing components 17 (FIG. 2d). The second individual layer 16 corresponds in construction and production to the adhesive layer shown in FIG. 2a. The reinforcing components, preferably in the form of fibers or structures such as rods or rigidly constructed moldings of metal, glass fibers, plastics or carbon fibers or, as shown, nail-shaped metal pins or alternatively bilaterally cropped tie rods, preferably protrude out of the laminar structure 14 into the filler material and interlock therewith in a form-locking manner during the setting procedure.

Figure 3:
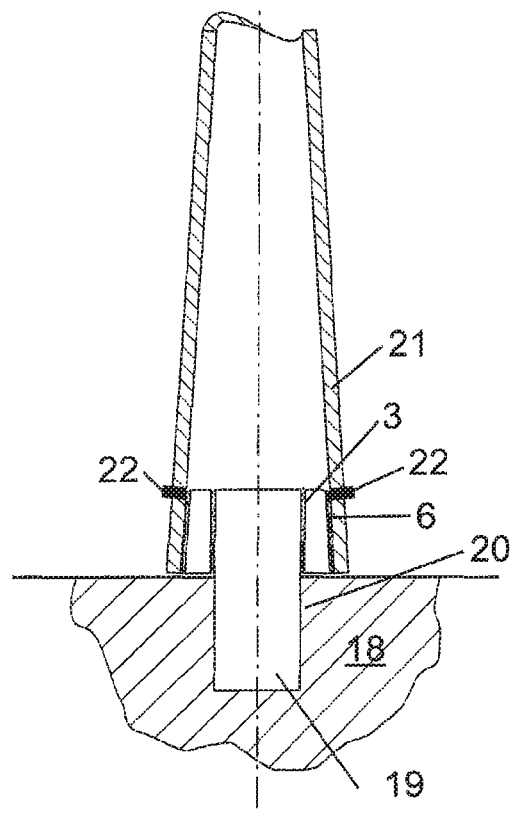
FIG. 3 is a sectional view of an exemplary mast anchoring having a non-cylindrically encircling annular gap.

FIG. 3 is a sectional view of an example of a ground anchoring of a mast having a non-cylindrically encircling annular gap 7. The first joining partner consists of a preferably cylindrical bollard 19 which has been introduced vertically into a concrete base 18 and the lateral surface 20 of which above the concrete base is formed by the joining surfaces. The second joining partner consists of a preferably metallic mast 21 with an inner joining surface, which mast is pushed over the bollard by its lower open end, the two joining surfaces, each with an adhesive layer 3 and 6, laterally delimiting the joining gap 7 for the filler material 8. The joining gap is preferably filled laterally with preferably flowable filler material via sprue apertures 22 in the mast in the region of the joining surfaces. These sprue apertures are preferably distributed around the mast circumference at equal angles to one another. A setting of the filler material into the sprue apertures advantageously allows an additional form-locking attachment to the joining surfaces.

Tensile tests were carried out to investigate the axial bearing capacity of a connection comprising steel pipes arranged coaxially one inside the other, as shown by way of example in FIG. 1. In this respect, the inner pipe and thus the outer joining surface of the inner pipe have a diameter of 33.7 mm; the outer pipe and thus the inner joining surface of the inner pipe have a diameter of 68.1 mm. This produces a joining gap width of 17.2 mm which extends in the axial direction over an overlap length of 45 mm. The adhesive layer consists of a matrix of epoxy resin adhesive of type EP40617/EP42089 (produced by Kömmerling, Pirmasens, Germany), solids particles were scattered onto the freshly applied adhesive layer until solids particles no longer pass into the adhesive layer or remain adhering thereto:

Test series 1: adhesive layer with special fused alumina as solids particles (special fused alumina KF100, grain size<0.1 mm)

Test series 2: adhesive layer with silica sand as solids particles (grain size<2.0 mm)

Test series 3: adhesive layer with gravel chippings as solids particles (grain size<4.0 mm)

For comparison, a further test series 4 was carried out with the same joining partners and filler material, but without an adhesive layer and solids particles. Table 1 below summarizes the test loads of the above-mentioned test series:

TABLE 1

Axial bearing capacities of test series 1 to 4

| Test series | Sample | Fmax [kN] Adhesive bond | Residual bearing capacity due to friction |
|---|---|---|---|
| 1 | 1-01 | 104.6 | |
| 1 | 1-02 | 106.9 | |
| 1 | 1-03 | 109.1 | |
| 2 | 2-01 | 111.4 | |
| 2 | 2-02 | 110.6 | |
| 2 | 2-03 | 111.6 | |
| 3 | 3-01 | 111.0 | |
| 3 | 3-02 | 110.9 | |
| 3 | 3-03 | 109.5 | |
| 4 | 4-01 | 10.2 | 25.5 |

TABLE 1-continued

Axial bearing capacities of test series 1 to 4

| Test series | Sample | Fmax [kN] Adhesive bond | Residual bearing capacity due to friction |
|---|---|---|---|
| 4 | 4-02 | 12.5 | 37.5 |
| 4 | 4-03 | 15.0 | 28.3 |

It is possible to establish a ten-fold increase in the bearing capacity of the connection, modified with organic adhesive layers and solids particles, compared with conventional mortaring without an adhesive layer. However, failure occurs within the elastic range, i.e. after the adhesive bond has failed, unlike the conventional mortaring and without a toughness-increasing reinforcement of the filler material of the aforementioned type, there is no longer any residual bearing capacity of the connection. After a further shift by a few mm, it falls to 0 kN. This effect is due to the preferably low-flow and thereby brittle behavior of the adhesive. However, reference is also made here to the extremely low dispersion of the breaking loads of the hybrid-bonded pipes. It can be assumed that this failure pattern is changed by using a less brittle adhesive or by the additional reinforcement of the mortar.

Figure 4:
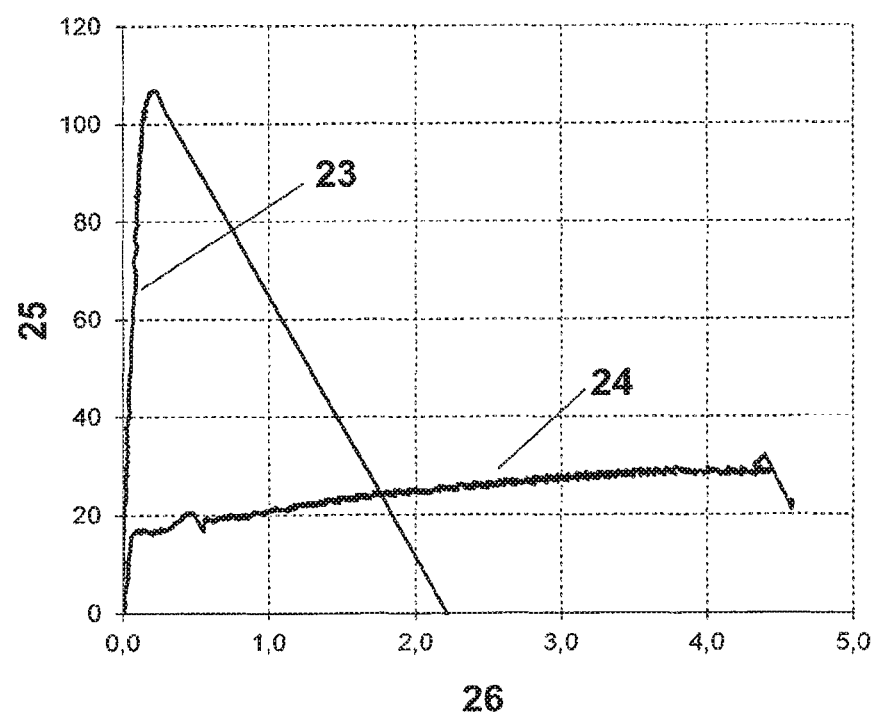
FIG. 4 shows by way of example load-deformation curves of a test of a pipe connection according to FIG. 1 (solid curve) compared with a conventional mortared pipe connection without an adhesive layer of the aforementioned type (dashed curve) in an axial tensile test.

FIG. 4 shows a graph in which the tensile force 25 in [kN] is plotted over the local deformation 26 in [mm]. The graph shows by way of example the load deformation curves 23 and 24 of a test of a pipe connection according to FIGS. 1 and 2*a* (with two adhesive layers 23), compared with a conventional mortared pipe connection without an adhesive layer of the aforementioned type (24) in the axial tensile test.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 inner pipe
2 outer joining surface of inner pipe
3 first adhesive layer
4 outer pipe 5 inner joining surface of outer pipe
6 adhesive layer
7 joining gap
8 filler material
9 open side of joining gap
10 annular sealing plug
11 solids particles
12 partly surrounded proportion of solids particles
13 surface of adhesive
14 laminar structure
15 first individual layer
16 second individual layer
17 reinforcing component
18 concrete base
19 bollard
20 lateral surface
21 mast
22 sprue aperture
23 load deformation curve of connection with adhesive layers
24 load deformation curve of conventional connection
25 tensile force in [kN]
26 local deformation in [mm]

The invention claimed is:

1. A connection between at least two joining partners, comprising:
an interlying joining gap, with opposite joining surfaces,
wherein at least one of the joining surfaces is wetted with an adhesive layer having incorporated and/or attached solids particles,
wherein the remaining joining gap is filled with an inorganic and/or organic filler material,
wherein the adhesive layer having incorporated and/or attached solids particles forms a first connection layer, and
wherein the inorganic and/or organic filler material forms a second connection layer.

2. The connection according to claim 1, wherein the adhesive layer is formed by a laminar structure comprising at least two individual layers.

3. The connection according to claim 1, wherein a reinforcement in the form of fibers or structures of metal, glass, plastics or carbon is introduced in the joining gap or in the filler material or in the filler material extending into the adhesive layer.

4. The connection according to claim 1, wherein the two joining partners are formed by a connector having a rotationally symmetrical outer surface and by a sleeve having an encircling, rotationally symmetrical inner surface.

5. The connection according to claim 1, wherein the two joining partners are formed by two pipe elements of different diameters which are arranged one inside the other.

6. The connection according to claim 1, wherein the joining gap has different joining gap widths over the extent of the joining surfaces and/or the adhesive layer and/or the filler material have different layer thicknesses over the extent of the joining surfaces.

7. The connection according to claim 1, wherein the solids particles consist of a non-metallic inorganic material and/or a metallic material.

8. The connection according to claim 1, wherein the incorporated and/or attached solids particles are smaller than a width of the joining gap.

9. The connection according to claim 1, wherein the inorganic and/or organic filler material is a grouting mortar, and
wherein the adhesive layer having incorporated and/or attached solids particles includes reinforcing components that protrude out of the adhesive layer and into the inorganic and/or organic filler material.

10. The connection according to claim 1, wherein the incorporated and/or attached solids particles have a non-wetted surface portion that has never been wetted by an adhesive of the adhesive layer, and
wherein the non-wetted surface portion of the incorporated and/or attached solids particles forms an attachment with the inorganic and/or organic filler material.

11. A method for producing a connection between two joining partners, having a joining gap, with opposite joining surfaces, the method comprising the following steps:
a) positioning the two joining partners against one another, the joining surfaces thereof being opposite one another at least in part, with formation of the joining gap,
b) filling the joining gap with an inorganic filler material, and
c) curing the inorganic filler material in the joining gap,
wherein before the positioning the two joining partners against one another, the method further comprises:
d) coating at least one of the joining surfaces with an organic adhesive layer having incorporated and/or attached solids particles, and
e) curing the organic adhesive layer having the incorporated and/or attached solids particles,
wherein the organic adhesive layer is a laminar structure including a first layer and a second layer,
wherein the first layer of the laminar structure does not include any solids particles,
wherein coating at least one of the joining surfaces with an organic adhesive layer having incorporated and/or attached solids particles includes first applying the first layer as a foundation and second applying a second layer of the laminar structure to the first layer of the laminar structure, and
wherein the second layer includes the incorporated and/or attached solids particles.

12. The method according to claim 11, wherein the method steps a) to e) are carried out in the stated sequence.

13. The method according to claim 11, wherein according to step d), the joining surfaces are initially coated in a first partial step with the adhesive layer, and then in a second partial step, the solids particles are applied to the adhesive layer.

14. The method according to claim 11, wherein an adhesive bond between the filler material and solids particles takes place by a chemical or physical activation after the inorganic filler material has cured.

15. The method according to claim 11, wherein the form fit between the filler material consisting of organic and/or organic and inorganic components and the inorganic adhesive layer takes place by a chemical or physical activation after the inorganic and/or organic filler material has cured.

16. The method according to claim 11, wherein steps d) and e) are carried out at a different location than steps a) through c).

17. The method according to claim 11, wherein before being filled, the joining gap is sealed by sealants having at least one sprue aperture and a riser volume, to form an otherwise closed joining gap volume.

18. The method according to claim 11, wherein the inorganic filler material includes a mineral binder, the method further comprising forming an integral bond between the incorporated and/or attached solids particles of the adhesive layer with the mineral binder of the inorganic filler material.

19. A connection between at least two joining partners, comprising:
    an interlying joining gap, with opposite joining surfaces,
    wherein at least one of the joining surfaces is wetted with an adhesive layer having incorporated and/or attached solids particles,
    wherein the remaining joining gap is filled with an inorganic and/or organic filler material, and
    wherein the incorporated and/or attached solids particles are smaller than a width of the joining gap.

20. The connection according to claim 19, wherein the inorganic and/or organic filler material is a grouting mortar, and
    wherein the adhesive layer having incorporated and/or attached solids particles includes reinforcing components that protrude out of the adhesive layer and into the inorganic and/or organic filler material.

* * * * *